United States Patent
Wermuth et al.

(10) Patent No.: US 9,438,386 B2
(45) Date of Patent: Sep. 6, 2016

(54) MOBILE AD-HOC NETWORK

(71) Applicant: RAFAEL ADVANCED DEFENSE SYSTEMS LTD., Haifa (IL)

(72) Inventors: Yoav Wermuth, Liehman (IL); Michal Wermuth, Liehman (IL); Shimon Avadis, Yokne'am (IL); Itzhak Fuchs, Mozkin (IL); Moshe Weiss, Carmiel (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 121 days.

(21) Appl. No.: 14/274,125

(22) Filed: May 9, 2014

(65) Prior Publication Data
US 2014/0247804 A1 Sep. 4, 2014

Related U.S. Application Data

(63) Continuation-in-part of application No. PCT/IL2012/050447, filed on Nov. 8, 2012.

(30) Foreign Application Priority Data

Nov. 10, 2011 (IL) .......................................... 216282

(51) Int. Cl.
H04W 72/12 (2009.01)
H04L 5/00 (2006.01)
(Continued)

(52) U.S. Cl.
CPC ............ *H04L 5/0005* (2013.01); *H04W 72/02* (2013.01); *H04W 84/18* (2013.01)

(58) Field of Classification Search
CPC .... H04L 5/0005; H04W 72/02; H04W 84/18
USPC ................................................. 370/329–330
See application file for complete search history.

(56) References Cited

U.S. PATENT DOCUMENTS 6,091,362 A 7/2000 Stilp
7,639,652 B1 12/2009 Amis et al.
(Continued)

FOREIGN PATENT DOCUMENTS

EP 2023551 A1 2/2009
EP 2081328 A1 7/2009
(Continued)

OTHER PUBLICATIONS

D. Barras, F. Ellinger, and H. Jackel, "A Comparison between Ultra-Wideband and Narrowband Transceivers," IEEE Wireless 2002, 2002. retrieved from the Internet http://www2.ife.ee.ethz.ch/case/ife/publications/comparisonOfTransceivers.pdf.
(Continued)

*Primary Examiner* — Kwang B Yao
*Assistant Examiner* — Syed Bokhari
(74) *Attorney, Agent, or Firm* — Kinney & Lange, P.A.

(57) ABSTRACT

A mobile communication system which consists of a plurality of MANETs and nodes, which comprises a transceiver at each node. Each transceiver is a combination of a hopping transmitter operating according to a predetermined hopping sequence and rate and a wideband reference receiver, that can simultaneously receive at once, the whole operating band assigned to the system. Each transceiver further includes a circuitry for reallocating simultaneously receiving channels, dynamically spread over a wideband frequency range and circuitry for determining transmission hopping patterns to use the least possible number of frequencies according to the active population status of nodes that belong to the plurality of MANETs. This circuitry is also used for adapting the transmission scheme of the alien transceivers by finding time slots, in which a counterpart receiver at each remaining active node is not transmitting and a frequency channel, in which no other active node, neighboring the counterpart receiver transmits, while determining proper transmission frequency for each transmitting node.

12 Claims, 14 Drawing Sheets

(51) Int. Cl.
*H04W 72/02* (2009.01)
*H04W 84/18* (2009.01)

(56) References Cited

U.S. PATENT DOCUMENTS

| | | | |
|---|---|---|---|
| 8,279,895 | B2 | 10/2012 | Cordeiro |
| 2004/0028018 | A1 | 2/2004 | Cain |
| 2008/0112426 | A1 | 5/2008 | Seidel |
| 2008/0112428 | A1 | 5/2008 | Seidel |
| 2012/0155511 | A1 | 6/2012 | Shaffer |
| 2012/0250632 | A1* | 10/2012 | Mo ............... H04W 74/006 370/329 |

FOREIGN PATENT DOCUMENTS

| | | |
|---|---|---|
| EP | 2124501 | 11/2009 |
| WO | 2009102906 A1 | 8/2009 |

OTHER PUBLICATIONS

International Search Report dated Mar. 24, 2013 for PCT/IL2012/050447.

International Preliminary Report on Patentability dated Mar. 19, 2014 for PCT/IL2012/050447.

* cited by examiner

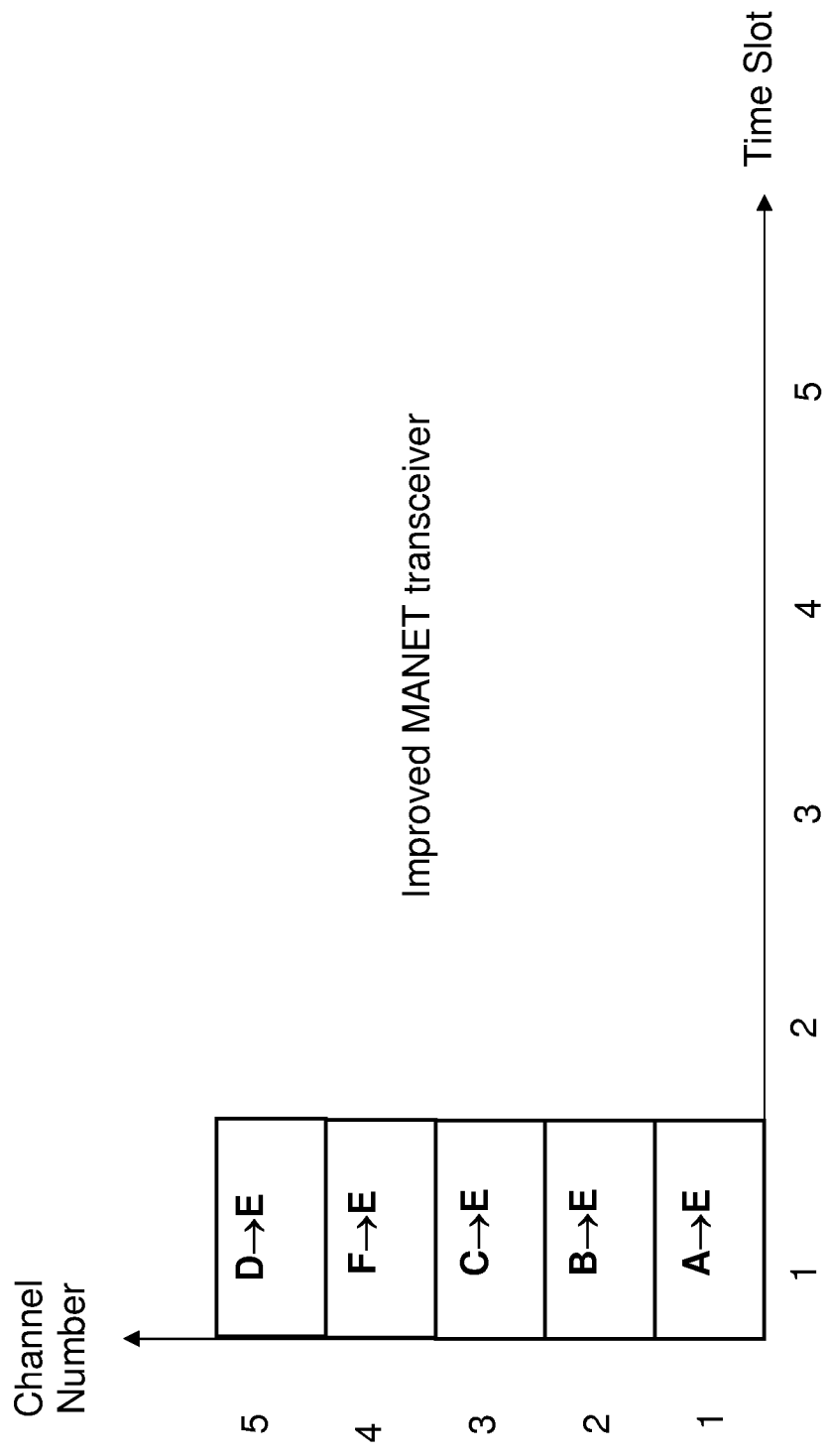

MOBILE AD-HOC NETWORK

FIELD OF THE INVENTION

The present invention relates to the field of mobile communication. More particularly, the invention relates to a method for improving the spectral efficiency and scalability of mobile ad-hoc networks.

BACKGROUND OF THE INVENTION

Mobile Ad-hoc NETworks (MANETs) are self-formed and self-healing wireless networks that support data and/or voice communication between mobile or stationary nodes without any physical infrastructure.

A MANET is a type of "Mesh Network", with added mobility capabilities. In Mesh Networking, each node in the network may act as an independent router, regardless of whether or not it is connected to another network. It provides continuous connections and reconfiguration around broken or blocked paths by "hopping" from a node to another node, until the destination is reached. FIG. 1 (prior art) shows an exemplary connection path between node "A" and node "B" in a typical Mesh network.

Mesh networks are self-healing: the network can still operate when one node breaks down or when the quality of a connection is low. MANET is a mesh network, capable of dealing with the problems introduced by the mobility of the nodes. One of the drawbacks of Mesh networks is that if several subscribers need to hop through the same node, this creates a "bottleneck" at that node, and the data rate of the contending subscribers is substantially reduced.

Each mobile node manages dynamic routing tables that track the MANET topology. The routing tables may be established by running any routing protocol suitable for MANETs, for example Optimized Link State Routing protocol (OLSR—an IP routing protocol optimized for mobile ad-hoc networks) or Ad hoc On-Demand Distance Vector routing protocol (AODV—a routing protocol for mobile ad hoc networks). OLSR is a proactive Link State (LS) algorithm that holds the radio link status information, and AODV is a reactive Distance Vector (DV) algorithm that holds only the distances to all the other nodes. The topology may possibly include additional parameters, such as link quality, physical location and channel frequency.

MANETs can be used either in military environment, or in areas where the existing infrastructure collapsed (e.g., disaster areas) or is not sufficient. In the recent years, there has been a growing need for wideband MANET capabilities to support more users (nodes) and more demanding applications. However, the spectrum resource is scarce, and the current MANET algorithms do not exploit the spectrum efficiently enough, in order to meet the growing needs.

The MANET nodes are identified by a node ID and run a distributed Medium Access Control (MAC) algorithm that allocates time resources to nodes in every MANET channel. The system utilizes a limited number of radio channels, while managing every channel separately, and dividing the timeline of each channel between the MANET nodes. If the timeline is divided to slots (as shown in FIG. 2), the time division between MANET nodes is called "TDMA", namely Time Division Multiple Access (a channel access method for shared medium networks that allows several users to share the same frequency channel by dividing the signal into different time slots).

In wireless MANET networks, sophisticated distributed algorithms are needed to manage the access to several radio channels, determining for every node when to receive and when to transmit in any channel, for each time period.

In a standard MANET setting (where the transceiver can receive only one channel at a time), once the channel frequency has been set, the mesh networking is carried on only among the subscribers that are tuned to that channel, and the MAC algorithm has meaning only within the selected channel, and is blind to all other channels. Although the channel frequency can be selected among many frequencies, once it has been chosen, it becomes unrelated to the networking operation. Thus, a MANET system with a collection of channels, is in fact a collection of unconnected parallel MANET systems, each one working on its own channel only, with data rate and reliability performance limited by the width of one single channel. This observation is also true when the timeline is divided in time slots: during every time slot, in every channel, a different MANET is managed, and the participants of that MANET run distributed algorithms to decide how to divide the channel between them (i.e., to determine which node will transmit at what time).

Several algorithms have been proposed for providing improved data throughput to conventional MANETs, by using an architecture that includes multi-channel full-duplex (capable of receiving during transmission) or half-duplex (not receiving during transmission) transceivers. However, these algorithms are topology-transparent, namely, do not consider how many nodes in the system are actually there (are actually "live"). Rather, all the potential nodes in the system are assigned a "frequency selection table" with different transmission frequencies for each node, according to a predetermined algorithm, such as a Latin Square (an n×n array filled with n different symbols, each occurring exactly once in each row and exactly once in each column), while all the individual patterns are predetermined, and designed so to avoid collisions when the system is "fully populated" (close to its maximum capacity) by live nodes. The hopping patterns are constructed mostly using mathematical tools such as "Orthogonal Latin Squares" (n×n arrays filled with n different Latin letters, each occurring exactly once in each row and exactly once in each column, so that when they overlap, all possible pairs of letters occur), which ultimately generate simultaneous transmit/receive frequency pairs which never collide within the same time slot. However, such a collision-avoiding frequency pattern planning is global in nature, and involves using the whole available spectrum at once (in full duplex mode), or a fixed number of frequencies (in half-duplex mode). Therefore, the frequency usage is non-adaptive, and a substantial spectral efficiency improvement can be achieved only if the number of active nodes is close to the maximal allowable number of nodes in the system. If the system is not fully populated, the spectral efficiency drops drastically.

Clearly, since one of the main requirements of ad-hoc systems is to function while the number of live nodes may change abruptly without notice, the topology-transparent approach cannot ensure a consistent efficiency improvement and scalability.

In topology-transparent systems, if the number of nodes is small compared to its maximal allowable limit, the "whole band" hopping sequence may be longer than needed. It follows that there are "dead times" while a node uselessly hops through non-populated channels. This results in unnecessary idle periods where a node is not available. Moreover, if a node must transmit some recurrent information, such as present location data, the time period between refresh transmissions may become unnecessarily long, and the system information accessibility is impaired.

Most algorithms proposed in the prior-art references, assume that the nodes are capable of full-duplex operation (simultaneous reception during transmission), and this assumption is crucial in achieving a fully-populated spectral efficiency improvement. Anyone skilled in the art, is aware that implementing a full-duplex transceiver requires substantial separation between the transmit band and the receive band. This is because the wideband phase noise "tail" generated at the receive frequency by the synthesizer of the transmitter, causes an extremely powerful "white noise" to enter the receiver input. The power of this noise is always much greater than the desired signal to be received, and, unless filtered out before reaching the receiver input, will cause strong receiver "desensitization", namely, a dramatic loss of sensitivity, up to a total system crash. Therefore, when designing full-duplex transceivers, one must add a component known as a "duplexer". A duplexer is in essence a set of filters that perform the (relatively easy) task of preventing the power at transmit frequency from burning out the receiver, and the (difficult) task of clearing up the transmitter noise tail at receiving frequency, so to prevent receiver desensitization. Usually, the power of the noise tail at receive frequency must be reduced by a factor of at least 50 dB (five orders of magnitude), which can be done only if the transmitting band is well separated from the receive band (at least several times the whole operational bandwidth), and even then, the duplexer turns out to be a bulky and costly unit. If the transmit and receive bands are close, or even worse, if they overlap or are interleaved, the construction of a full-duplex transceiver is not feasible. To make things worse, the required transmitter-tail to receiver-input isolation cannot be achieved in mobile equipment by using separate transmit and receive antennas, since this would require a physical vertical separation of several meters, which can be achieved only using fixed pole-top-mounted antennas. Therefore, in many actual scenarios, one cannot make use of the prior-art full-duplex algorithms mentioned before.

Another prior-art topology-transparent algorithm makes use of a half-duplex transceiver, while utilizing a fixed number of frequencies, which is about half the number of the nodes in a fully populated system. Such algorithm has a two-fold drawback: (a) it cannot reach the best spectral-efficiency and time-efficiency on a sparsely-populated system, because the number of frequencies cannot adapt itself when the number of nodes changes, (c) even if the number of available frequencies is much more than dictated by the number of "live" nodes, the algorithm cannot dynamically add frequencies, and therefore, cannot utilize the whole available band in order to improve the system immunity or the transmission range.

The fact that the algorithms proposed in the prior-art references are "Topology transparent" (i.e., are "blind" to the number of live nodes in the system, and to alien transmitters) limits their capability of adaptively improving spectral efficiency and reliability.

US 2009/0274140 discloses a wireless communication system employing a multi-channel MAC protocol based on a superframe concept, which includes
a multi-channel PHY superframe structure that logically organizes a plurality of channels including a superframe per channel with a control window of a fixed duration and a remaining part. One of the superframes is a logical channel defined as a meeting point channel used to synchronize with the system; a transmitter that transmits superframes according to the PHY superframe structure; and a receiver that listens for the PHY superframe structure on a predetermined set of channels of the plurality of channels, such that a device synchronizes/resynchronizes with the system by the receiver periodically listens to the meeting point channel. However, the proposed system requires a control channel for allowing nodes to coordinate which node can transmit and via which channel. This control channel substantially becomes a bottleneck of the system.

"TDMA scheduling design of multihop packet radio networks based on Latin Squares", Ju et al, INFOCOM 1999, NY, U.S.A. discloses a multichannel topology-transparent algorithm for radio networks, based on Latin Squares with a guaranteed minimum throughput. The proposed algorithm has the flexibility to allow the growth of the network, i.e., the network can add more mobile nodes without recomputation of transmission schedules for existing nodes. However, in order to receive several channels within the same time slot, the proposed algorithm requires reception using several full-duplex receivers, which are costly.

"An Optimal Channel Access Protocol with Multiple Reception Capacity" (Chlamtac and Farago, IEEE Transactions on Computers, Vol. 43, No. 4, April 1994, pp 480-484) discloses A multiple channel access protocol has been for situations when the users of the system have multiple reception capacity and share several common channels. Under heavy homogeneous load, the protocol guarantees the maximum achievable throughput. The optimum throughput is achieved with minimum buffer size and with the smallest possible delay. It provides a collision free schedule of transmissions and can be applied to different systems, such as CDMA or FDMA packet radio networks. However, the system includes a fixed number of channels, regardless the number of active nodes, such that nodes fully occupy all the channels. For example, if there are 100 nodes and 50 channels, 50 nodes will transmit in each time slot and will not be able to receive each other. Therefore, the distribution of channels between nodes is not optimal. In addition, the proposed protocol is limited to unicast packets of fixed size.

It is therefore an object of the present invention, to improve the spectral efficiency and scalability of MANET systems.

It is another object of the present invention to provide an improved MANET system that is topology-aware and being capable of adapting its connectivity according to the number of "live" nodes.

It is a further object of the present invention to provide an improved MANET system that considers the presence of alien transceivers in its neighborhood, and being capable of adapting its connectivity to minimize interference.

It is yet another object of the present invention to provide an improved MANET system that is being capable of reducing latency (the amount of time it takes a packet of data to move across a network connection).

Other objects and advantages of the invention will become apparent as the description proceeds.

SUMMARY OF THE INVENTION

The present invention is directed to a method for improving the spectral efficiency and scalability of a Mobile Ad-Hoc Networking (MANET) system. Accordingly, data regarding the number of active nodes that belong to the MANET system and regarding the presence of alien transceivers in the neighborhood of the active nodes is continuously collected and processed. A transceiver architecture that includes a combination of a hopping transmitter and a wideband receiver is included at each node, wherein the wideband receiver receives and processes the whole operational band assigned to the system, at once, and includes channel frequencies that are dynamically selected within a wide operating bandwidth. All frequency channels within the whole operating band assigned to the system are simultaneously received, demodulated and decoded (if error correction coding was employed by the transmitters).

The whole operating band assigned to the system is simultaneously received, while keeping the architecture of the MANET system and transmission frequencies are determined to use the least possible number of frequencies according to the active population status, transmission requirements and priorities of the nodes. The processed data is used for adapting the transmission scheme in presence of alien transceivers. Time slots are found for each transmitting node, in which a counterpart transceiver at each remaining active node is not transmitting and a frequency channel in which no other active node, neighboring the counterpart node, transmits (so as to avoid collisions and conflicts at the destination nodes.

In case where short periodic messages should be transmitted, the system allows two neighboring nodes to transmit at the same time slots but in different frequencies, such that they do not receive each other (as being half-duplex transmitters) but during the next transmission cycle, they will not transmit at the same time slot.

Then the transmission frequency is determined and if no other node had chosen the same time slot, and if the transceiver is not transmitting in the slot, the transmission is received, while allowing relay nodes to transmit simultaneously, using different channels (in case when relaying without delay is implemented, as illustrated in FIG. 7).

For cases when delay is tolerable, the transmission timing of relay nodes is not directed to the same time slot.

In one aspect, the method may comprise the following steps:

a. at each node, providing a transceiver architecture that includes a combination of a transmitter being capable of dynamically selecting its channel frequencies within the whole operational RF band assigned to the system and a wideband receiver that is being capable of simultaneously receiving and processing signals received from nodes of the MANET in different frequency channels within the whole operational band assigned to the system, at once, and that includes channel frequencies, dynamically selected within a wide operating bandwidth;

b. allowing each node to simultaneously receive all other nodes which are in range within the whole operating band assigned to the system such that each of the remaining nodes determines the transmission frequency for each time slot; for each transmitting node:

c. finding time slots, in which a counterpart transceiver at each remaining active node is not transmitting and a frequency channel in which no other active node, neighboring the counterpart receiver, transmits; and d. if no other node had chosen the same time slot, and if the transceiver is not transmitting in the slot, receiving the transmission, while allowing relay nodes to transmit simultaneously, using different channels.

The decision which node in the MANET should transmit is made independently and separately for each time-slot.

The method may further comprise the following steps:
a. continuously collecting data regarding the number of active nodes that belong to the MANET system and regarding the presence of alien transceivers in the neighborhood of the active nodes;

b. processing the collected data;
c. determining frequency transmission patterns to use the least possible number of frequencies according to the active population status, transmission requirements and priorities of the nodes; and
d. using the processed data for adapting the transmission scheme in presence of alien transceivers, thereby avoiding transmission at frequencies of alien transmitters.

The present invention is also directed to a mobile communication system consisting of a plurality of MANETs, which comprises, at each node:

a) a transceiver which is a combination of:
   a.1) a hopping transmitter operating according to a predetermined hopping sequence and rate;
   a.2) a wideband reference receiver, that can simultaneously receive at once, all frequency channels within the whole operating band assigned to the system;
b) circuitry for reallocating simultaneously receiving channels, dynamically spread over a wideband frequency range; and
c) circuitry for determining transmission hopping patterns to use the least possible number of frequency channels according to the active population status of nodes that belong to the plurality of MANETs and for adapting the transmission scheme of the alien transceivers by finding time slots, in which a counterpart receiver at each remaining active node is not transmitting and a frequency channel in which no other active node, neighboring the counterpart receiver transmits, and determining proper transmission frequency for each transmitting node.

The decision which node in the MANET should transmit is made independently and separately for each time-slot.

The system can receive and transmit broadcast packets, as well as packets of different size.

The number of active channels may be dynamically determined according to the number of active nodes and their data throughput demands.

The wideband reference receiver receives and processes all the channels within the whole operational RF band simultaneously, and may include:
a) a global band preselector for selecting a wide-band range;
b) a global Low Noise Amplifier for amplifying the selected wide-band range;
c) a global gain control unit, for controlling the global gain of the wideband reference receiver;
d) an anti-aliasing filter for filtering the amplified signals;
e) one or more Analog to Digital Converters (ADCs) for sampling the received signal;
f) an ADC driver for controlling the operation of the ADCs;
g) a control unit for controlling the gain of the global gain control unit; and
h) a digital signal processing unit for processing at once, samples from the whole RF band.

The digital signal processing unit may be capable of:
h.1) simultaneously detecting a plurality of signals, transmitted by nodes of said MANET, each at a frequency channel within the assigned RF wide band;
h.2) simultaneously reconstructing the data carried by said plurality of signals.

The processing of the digital processing unit includes, for each time slot and for all frequency channels in the whole operation band where the received signal energy is above a noise threshold, demodulation of the signal and error correction decoding.

The reference transmitter may include:

a) signal processing unit for generating a transmit baseband signal samples of the modulated signal, right at final frequency, in a digital form;
b) a Digital to Analog Converter (DAC) for converting the samples to analog values;
c) a first global-band filter for transforming the signal samples out of the DAC to an analog form;
d) a low-level RF pre-amplifier for pre-amplifying the analog signal being output by the global-band reconstruction filter;
e) a power-control attenuator, whose attenuation level is dynamically controlled by the control unit, for adjusting the power level of the amplified signal;
f) a second global-band filter connected to the attenuator output, for filtering far-out distortion products generated by the RF pre-amplifier;
g) an RF Driver followed by a final Power Amplifier (PA), for amplifying the output of the second global-band filter up to a level being sufficient to drive the final Power Amplifier (PA) to the maximal allowed transmit power;
h) a global-band Harmonic Filter, connected to the output of the final Power Amplifier (PA), for filtering the PA products at multiples of the transmit frequency; and
i) a transmit antenna for transmitting the filtered signal at the output of the global-band Harmonic Filter.

Nodes may receive and transmit by using half-duplex transceivers.

The digital signal processing section may be implemented using Field Programmable Gate Arrays (FPGAs).

The received signal may be directly sampled at Radio Frequency, or indirectly sampled after down-conversion.

BRIEF DESCRIPTION OF THE DRAWINGS

In the drawings:

FIG. 5c shows an example of a MAC with added frequency dimension, implemented using an improved transceiver architecture, according to an embodiment of the invention;

DETAILED DESCRIPTION OF THE INVENTION

The improved MANET system proposed by the present invention uses a wideband receiver, along with sophisticated signal processing, in order to take advantage of the simultaneous reception of several channels, arbitrarily spread over a wideband frequency range, while remaining within the context of a MANET architecture. The proposed MANET system is "Topology aware" (adapts its behavior according to the number of "live" nodes belonging to its own system) and "Cognitive" i.e., checks for the presence of "alien" transceivers in the neighborhood (which may be adjacent or non-adjacent nodes not belonging to the same system, but interfering with it), and adapts its behavior to minimize interference or optimize performance. This topology and alien transceivers awareness leads to major advantages related to accessibility, availability, and system performance.

The transceiver architecture of the improved MANET system includes an independent transmitter which may operate on predetermined fixed channels, or may be hopping according to some hopping sequence and rate. The transceiver architecture also includes an analog wideband receiver, covering the entire allocated frequency band. The signal processing unit is capable of processing simultaneously, at each time slot, all the signals transmitted by neighboring nodes of the receiver, whatever frequency they choose to transmit The frequencies may be either a set of fixed frequencies, or a set of frequency hopping patterns, each pattern common to members of a "sub-network" of the global MANET, or any arbitrary frequencies determined by the MAC algorithm of the neighboring nodes.

A spectrum-efficient MANET with increased time efficiency and reduced latency uses simultaneous reception and comprises a reference receiver and a reference transmitter.
Prior Art Reference Receiver For the purpose of illustrating the basic implementations of the improved MANET algorithms, either a two-receiver reference configuration or a four-receiver reference configuration is chosen as the reference receiver.

Figure 3A:
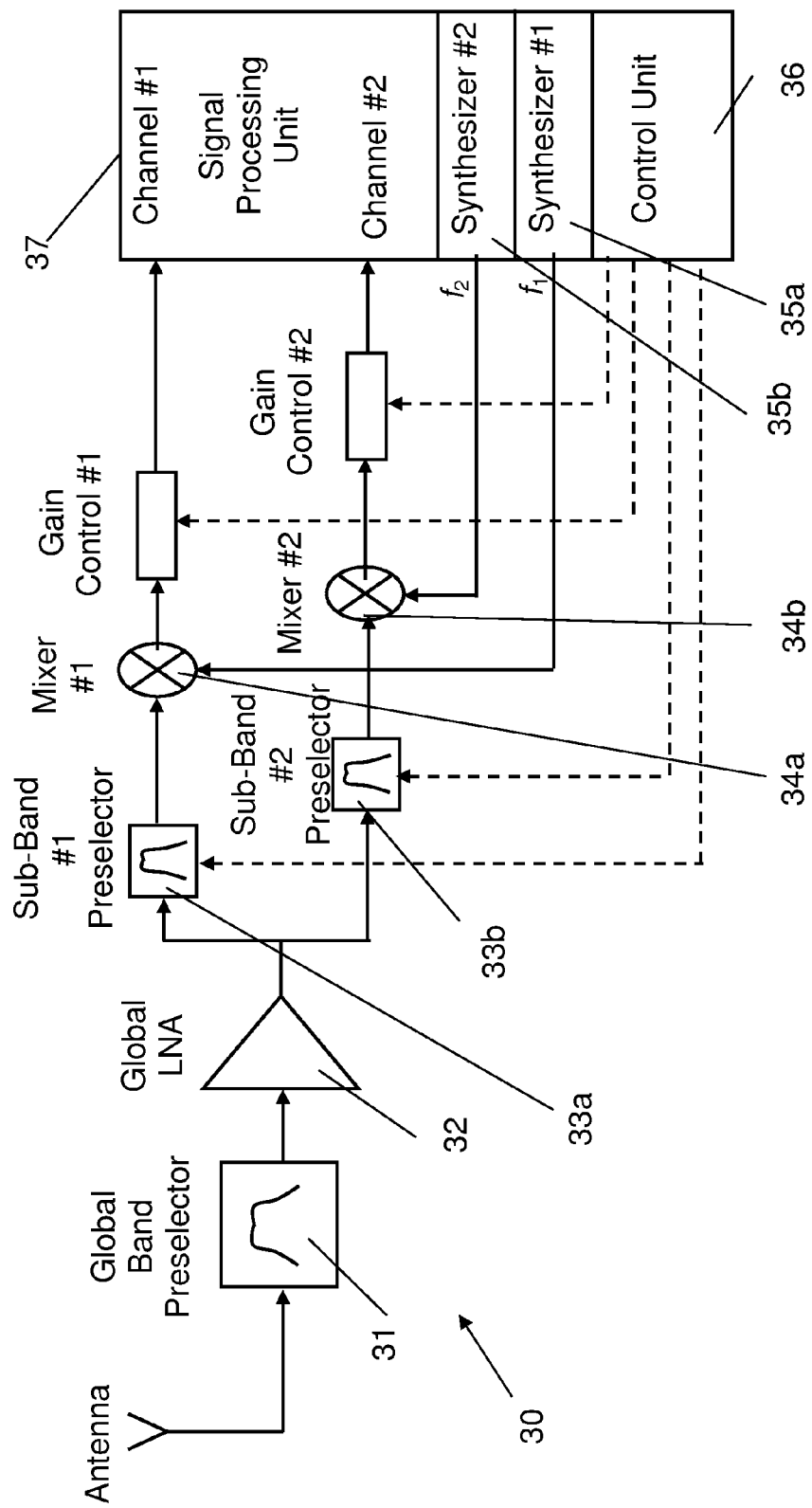
FIG. 3a is a block diagram of a reference receiver with two independent receiving channels, according to an embodiment of the invention.
Figure 3B:
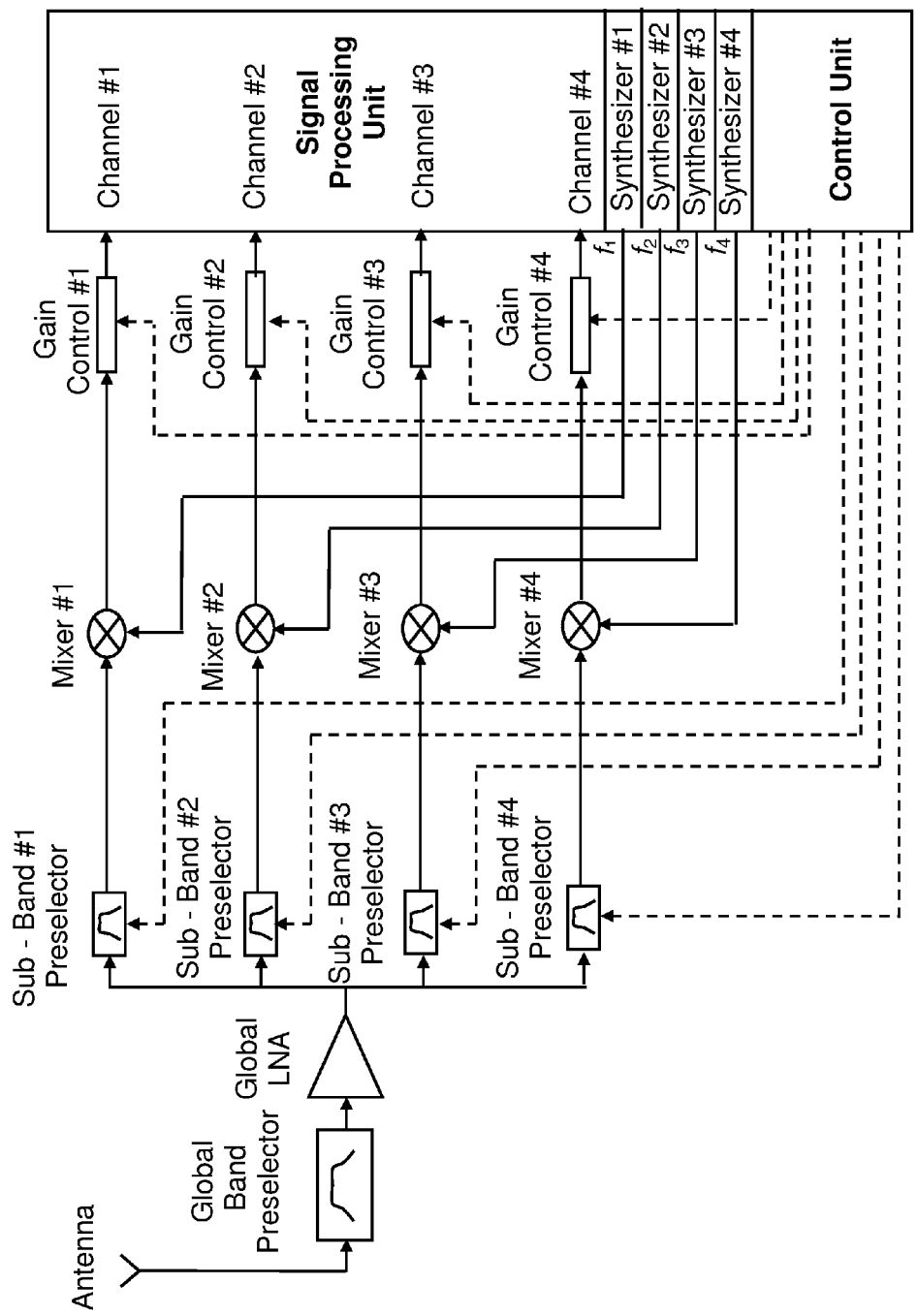
FIG. 3b illustrates a block diagram of an expanded version with four independent receive channels, according to an embodiment of the invention.

FIG. 3a illustrates a block diagram of a prior art reference receiver with two independent receiving channels. Solid lines indicate radio-frequency (RF) paths, and dashed lines indicate control paths. The receiver architecture includes at least two independent receiving paths, each one providing an individually programmable receiving channel. The reference receiver 30 comprises a global band preselector 31, which selects the wide-band range and forwards it to a global Low Noise Amplifier (LNA) 32 for amplification. The global wide-band range is split into sub-bands by means of programmable preselector filters 33a and 33b. The Local Oscillator (LO) signals, feeding the mixers 34a and 34b at variable frequencies $f_1$ and $f_2$ (for the two channel version, as shown in FIG. 3a) or $f_1$ $f_2$, $f_3$ and $f_4$ (for the four channel version, as shown in FIG. 3b), are generated by independent synthesizers 35a and 35b, each programmed by the control unit 36. The LO signals, the sub-band ranges, and the gain control levels, are dynamically determined by the digital control unit 36, according to the receive method employed, and the frequency and strength of the desired receive channels. The outputs of the mixers are at a common low intermediate frequency (IF), and are connected to the signal processing unit 37, usually of the FPGA type (due to the high processing speed required), which carries out signal sampling (at IF frequency) and digital processing of all channels simultaneously.

Multi-channel receivers up to four independent channels have already been made available commercially. For instance, Rockwell-Collins offers the "FlexNet-Four", which includes up to four receivers, independently programmable over the HF/VHF/UHF bands (2÷2000 MHz), and IAI/ELTA offers the "ARC-840D", which comes in two-receiver and four-receiver configuration, independently programmable over the VHF/UHF bands (30÷1220 MHz). Thus, receiver architectures with up to four independent receivers are of proven feasibility. More independent channels may be readily added by replicating the parallel branches.

FIG. 3b illustrates a block diagram of an expanded version (of FIG. 3a) with four independent receive channels. Solid lines indicate radio-frequency (RF) paths, and dashed lines indicate control paths. Since the hardware complexity is fast-growing, more than four channels may become less practical. A similar array may be picked-up by any person skilled in the art.

Improved MANET Reference Receiver

Figure 3C:
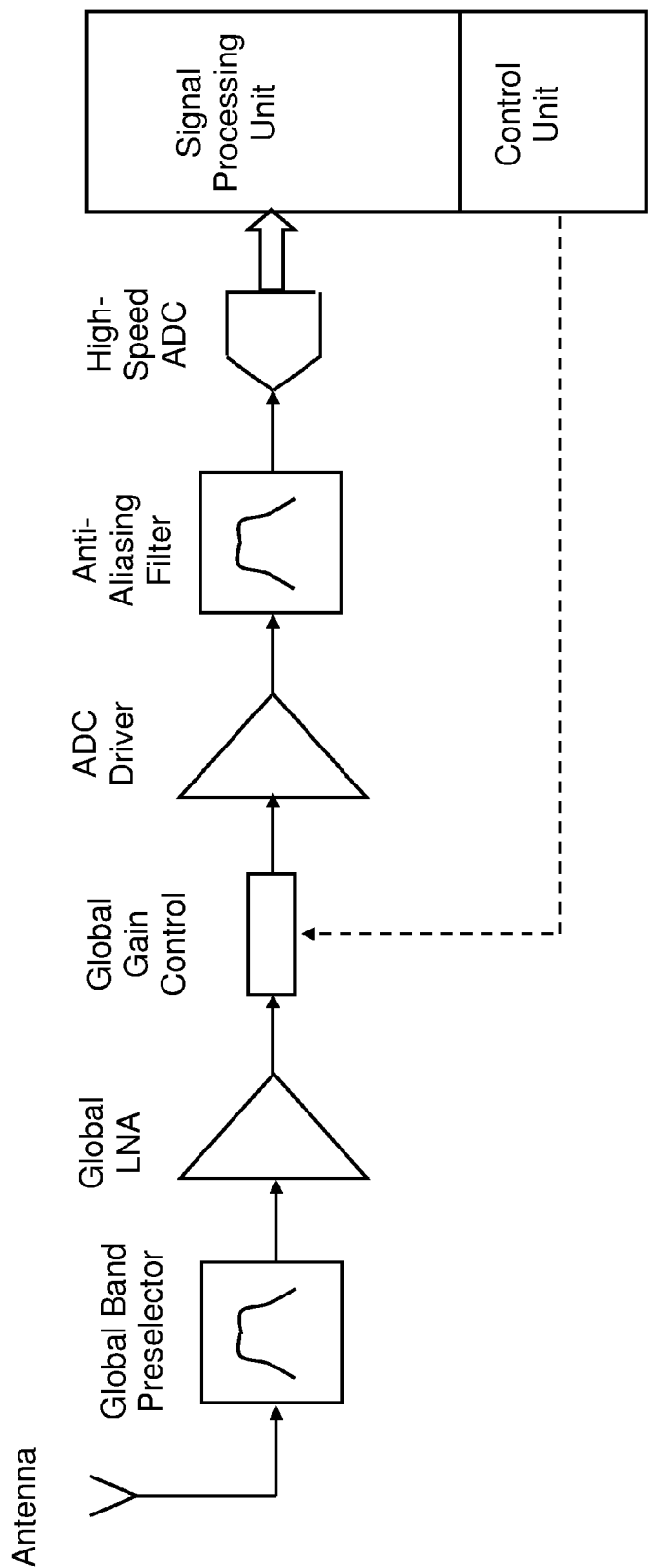
FIG. 3c illustrates a block diagram of a reference receiver, according to an embodiment of the invention.

FIG. 3c illustrates a block diagram of a reference receiver, according to an embodiment of the invention. Solid lines indicate RF paths, the dashed line indicates control path, and the wide arrow indicates a data bus. This receiver architecture is the most likely to be picked-up for wideband applications by a person skilled in the art. Using, for example, the 225-400 MHz UHF band which is normally allocated to airborne communication, it is possible to construct receivers which can simultaneously receive the whole band with sufficient dynamic range. The technologies that enable such receivers are (1) Analog to Digital Converters (ADC) which perform direct signal sampling at Radio Frequency (RF), and practically set the limit for the system's bandwidth and dynamic range, (2) the Digital Signal Processing section, which processes the whole RF band at once, and is usually implemented using Field Programmable Gate Arrays (FPGA) when dealing with high bandwidth systems. Such receiver architecture is currently viable for many systems. Digital processing power is now sufficient for nearly all applications, as well as ADC technology, which is sufficient for most systems that require the highest possible dynamic range. An example of a modern ADC that can be used in the implementation of the wideband reference radio receiver is the ADC12D1800 by National semiconductors, a dual channel ADC with a maximum sampling frequency of 1800 MHz on each of the channels. This device is specifically targeting wideband software defined radios. Thus, unlike a prior art receiver that receives only few channel at once, by splitting the band into sub-band and sequentially reprogramming the frequency of the channels, the reference receiver processes the whole band at once, i.e., receives all the channels simultaneously.

Figure 3D:
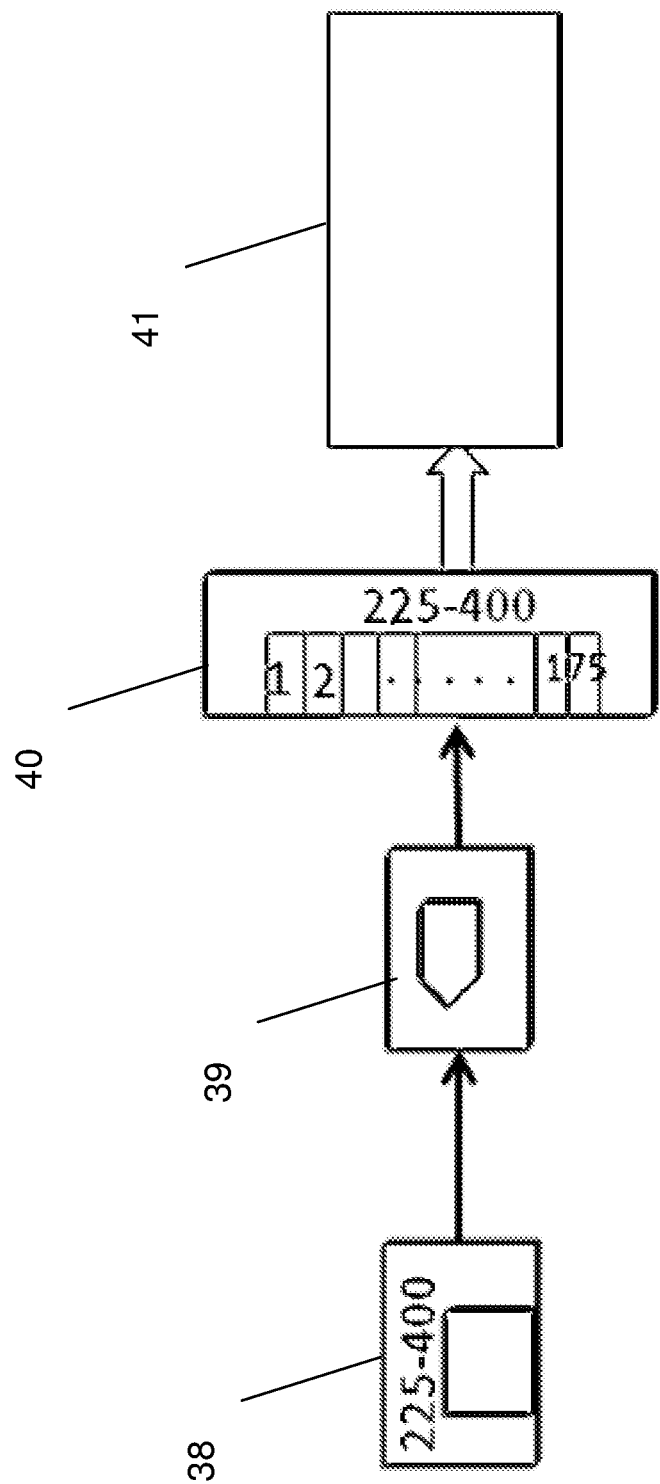
FIG. 3d illustrates a block diagram of a digital filter bank and modem with division to channels, according to an embodiment of the invention.

FIG. 3d illustrates a block diagram of a digital filter bank and modem with division to channels, according to an embodiment of the invention. The reference receiver includes an RF full-band filter 38 of 225-400 MHz, an Ultra-wideband ADC 39 and a multichannel network 40. Following the previous example of the 225-400 MHz UHF band, this band may be divided into 70 channels, spaced 2.5 MHz apart, and currently available FPGAs (such as the Startix of Altera Corporation San Jose, Calif., U.S.A.) can complete processing all 70 channels by the end of the time slot, which typically for MANETs relevant for the invention are 1-2 milliseconds.

Reference Transmitter

Figure 4:
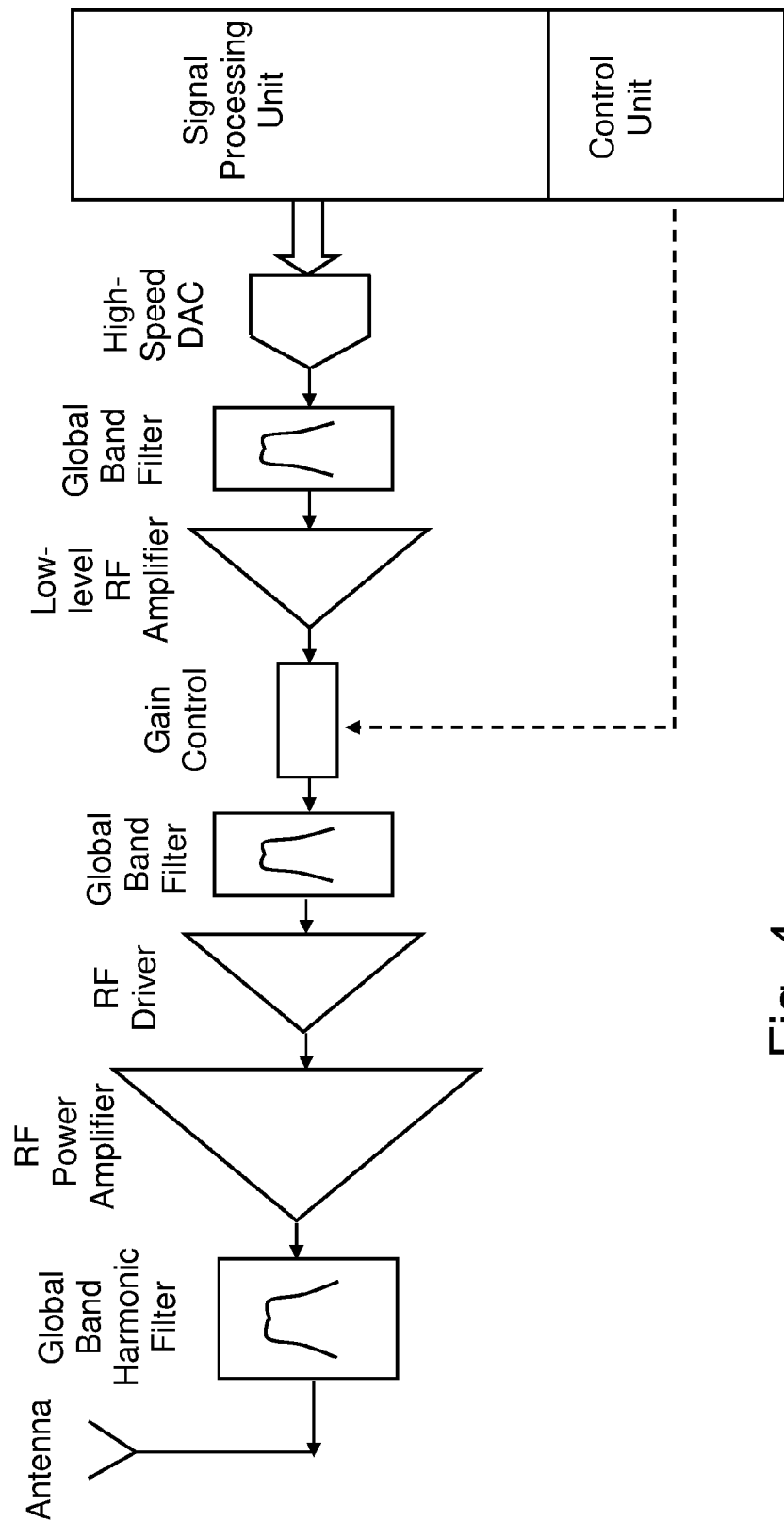
FIG. 4 is a block diagram of the reference transmitter, according to an embodiment of the invention.

FIG. 4 illustrates a block diagram of a reference transmitter, according to an embodiment of the invention. Solid lines indicate RF paths, the dashed line indicates control path, and the wide arrow indicates a data bus. This transmitter architecture is the most likely to be selected for wideband applications by a person skilled in the art. The samples of the modulated signal, right at final frequency, are mathematically generated by the signal processing unit in a digital form, and converted to analog form by means of a high-speed DAC (Digital to Analog Converter) such as the AD9739A (Analog Devices), which is capable to operate at a rate up to 2.5 Giga-Samples/Second. The signal samples out of the DAC are transformed to analog form by a global-band reconstruction filter, and pre-amplified by a low-level RF amplifier. Then the signal is fed to a power-control attenuator, whose attenuation level is dynamically controlled by the control unit. A global-band filter at the attenuator output cleans-up far-out distortion products generated by the pre-amplifier. The filter output is fed to an RF Driver, which amplifies it to a level sufficient to drive the final PA (Power Amplifier) to the maximal allowed transmit power. The output from the PA passes through a global-band Harmonic Filter, which cleans-up the PA products at multiples of the transmit frequency, and then the signal reaches the transmit antenna.

Improving the Spectrum-Efficiency and Scalability of a MANET

The present invention proposes a new method of MANET implementation that uses the spectrum more efficiently than in prior-art, and provides higher data rates and shorter latency than existing MANET implementation methods do. Unlike prior-art topology-transparent systems (which use the whole available spectrum, or a fixed portion of it), the improved MANET system proposed by the present invention exploits the capability of the reference receiver to simultaneously receive the whole frequency range (when the improved MANET reference receiver is employed) or several channels over a wideband frequency range (using a prior-art reference receiver), while in the context of a MANET architecture, and the fact that the improved MANET system is topology-aware, and uses the smallest (dynamically adaptive) spectral portion required, depending on the actual number of "live" nodes in the system.

The capability of simultaneously receiving the active channel frequencies, arbitrarily positioned within a wide operating band, makes these channel frequencies become part of a global MAC algorithm, namely, the simultaneous channel frequencies provide an additional dimension for the MAC algorithm, and the mesh system as a whole becomes frequency agnostic (with respect to the simultaneous channels) with respect to the networking algorithms. This is equivalent to having a single MANET system with data rate and reliability performance limited by a (larger) bandwidth, namely, a bandwidth equal to the sum of the individual bandwidths of the simultaneously "live" channels.

This property is particularly relevant but not limited to military MANETs, where the communication patterns are asymmetrical by nature: most nodes need to transmit much less data then they need to receive, as most communication types are Multicast or Broadcast; in civilian MANETs, users typically need to "download" more than they need to "upload". Hence, the reference transceiver architecture of the improved MANET, where the reception bandwidth is much higher than the transmission bandwidth is naturally suitable but not limited to the abovementioned applications. (It should be emphasized that the reference transceiver of our invention is not at all equivalent to the transceivers of the so called UWB (Ultra Wide Band) technology. In UWB, the bandwidth of the transmitted signal is very wide (several hundred MHz), and the receiver is composed of a single channel, whose bandwidth is matched to the transmitted signal; therefore, UWB technology is limited to very short ranges. Continuing the 225-400 MHz example, the transmitted signal bandwidth in the improved MANET and any of the receiver channels bandwidth might be 1 MHz, thus facilitating a very long range communication (e.g., 100 km. or more).

Figure 1:
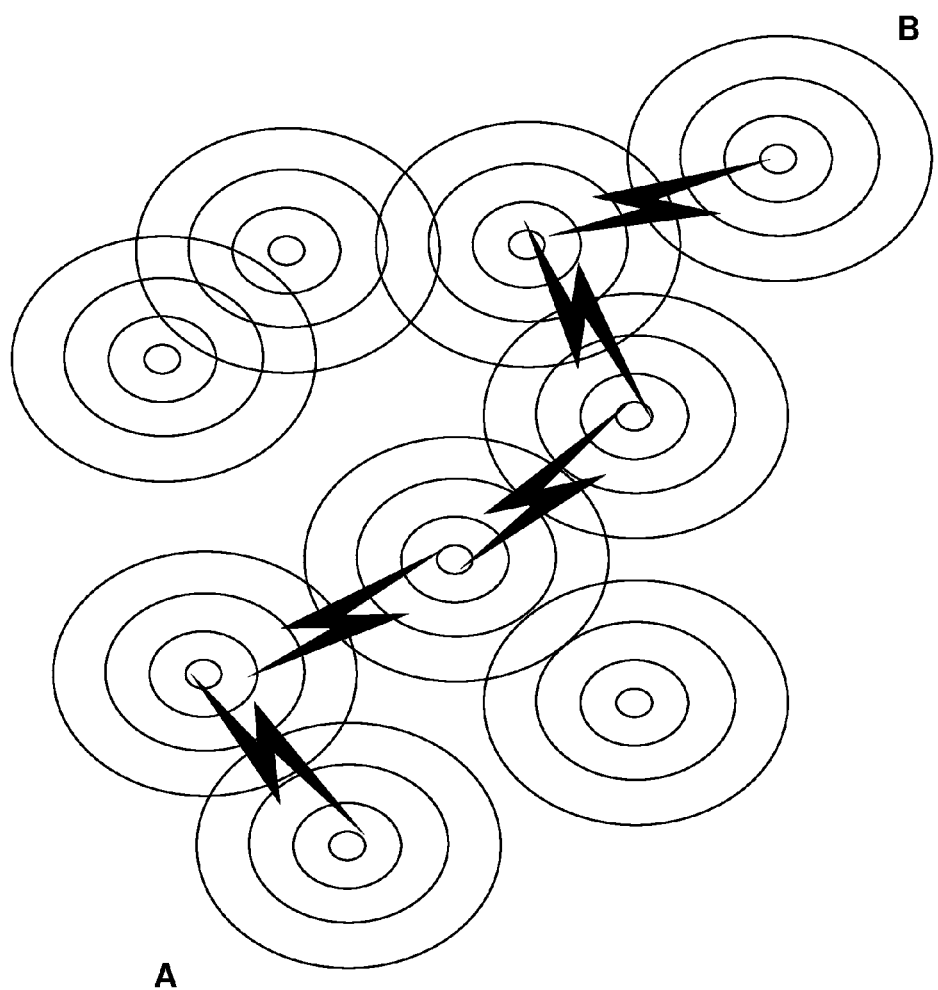
FIG. 1 (prior art) shows a conventional typical mesh connection.
Figure 2:
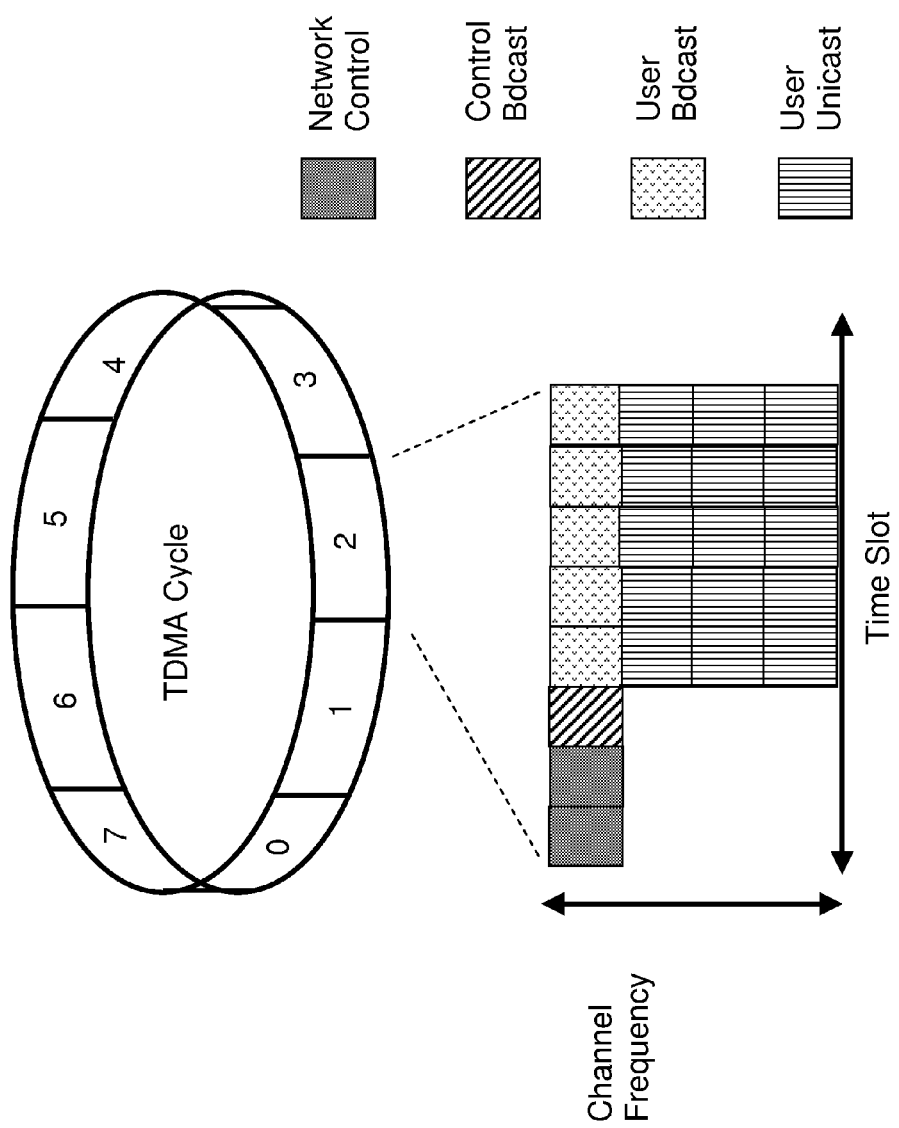
FIG. 2 (prior art) shows a typical TDMA cycle.

Furthermore, in prior art MANETs based on single receive channel architecture, it often is the case that several neighboring nodes, belonging to different "sub-nets" each tuned to different frequency channel, need to communicate. Thus special means are needed in these prior art MANETs to facilitate this communication, although they are all within the radio range of each other and physically there is no need for relaying; for instance, they send control messages on a common control channel, notifying each other to tune their frequency to a common frequency for the useful data transfer, these control messages consuming extra communication resources and reducing spectral efficiency, or with a time-sharing policy all nodes in the global MANET tune some part of the time frame to a common frequency channel, as in FIG. 2, for transmitting and receiving the "Inter-net" messages. During the time frame allocated for the common control or "Internet" communication, which can be as large as 50% if the inter-net communication load is heavy, all other frequency channels (3 in the example of FIG. 2) are idle, thus 37.5% of the spectrum is wasted in this example. If the number of "sub-nets" is large, say 20, the spectrum wasted in this example approaches 50%.

Moreover, in the same example, if in each sub-net there originally were M nodes that shared a frequency channel, once N>>M nodes originally belonging to separate sub-nets (i.e., different real or logical frequency channels) tune for the inter-net channel for inter-net communication, the rate drops from 1/M to 1/N, i.e., much lower. Therefore, there isn't any way in a prior art MANET with a single receive channel frequency to achieve scalability, while in our invention the inter-net data rate remains 1/M as long as all nodes are within radio range of each other, achieving high scalability.

With respect to latency, the system becomes in fact a collection of connected parallel MANET systems (as many as the simultaneous channels), with consequent latency reduction, due to the increase in the number of parallel networking paths available.

However, just making the frequency become part of the MAC algorithm, does not ensure spectral efficiency, or even practical feasibility of the system. Three major issues differentiate between conventional MANET and the proposed improved MANET:

Spectral Efficiency:

Unlike prior art MANET algorithms, the improved MANET algorithm is topology-aware, namely, the actual number of live nodes is checked, and the frequency hopping patterns are determined so to use the least possible number of frequencies accordingly. Therefore, there is no spectral waste, and efficiency is consistently improved for all possible populating scenarios. Moreover, the Improved MANET system is capable to dynamically resize the number of frequency used, not only to match the number of "live" nodes, but also to improve system immunity (or transmission range), for instance, by frequency-interleaving the transmitted data (or introducing information redundancy).

Accessibility and Availability:

Unlike prior art MANET algorithms, since the improved MANET systems use the smallest possible number of frequencies, according to the active population status, the "turnaround time" is the shortest possible.

Practical Feasibility:

The improved MANET algorithms proposed by the present invention use half-duplex transceivers. Half-duplex transceivers are flexible and easy to implement, as one is concerned only with protecting the receiver from burning-out during transmission. In one possible implementation, this protection can be easily and inexpensively achieved by means of a simple unit known as "antenna switch", which is capable to operate correctly regardless of the operating frequency.

Figure 5A:
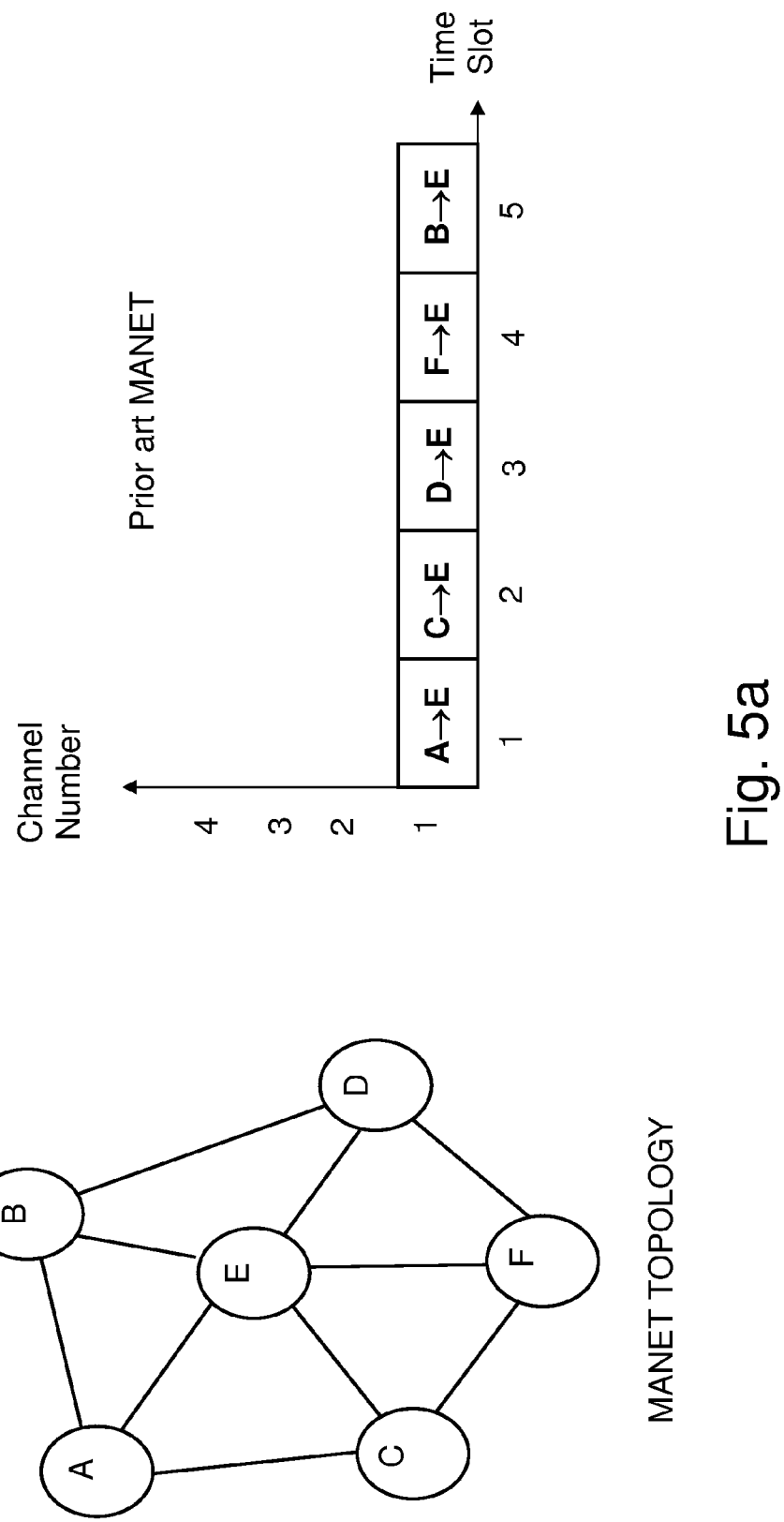
FIG. 5a shows an example of prior-art MANET network and MAC.
Figure 5B:
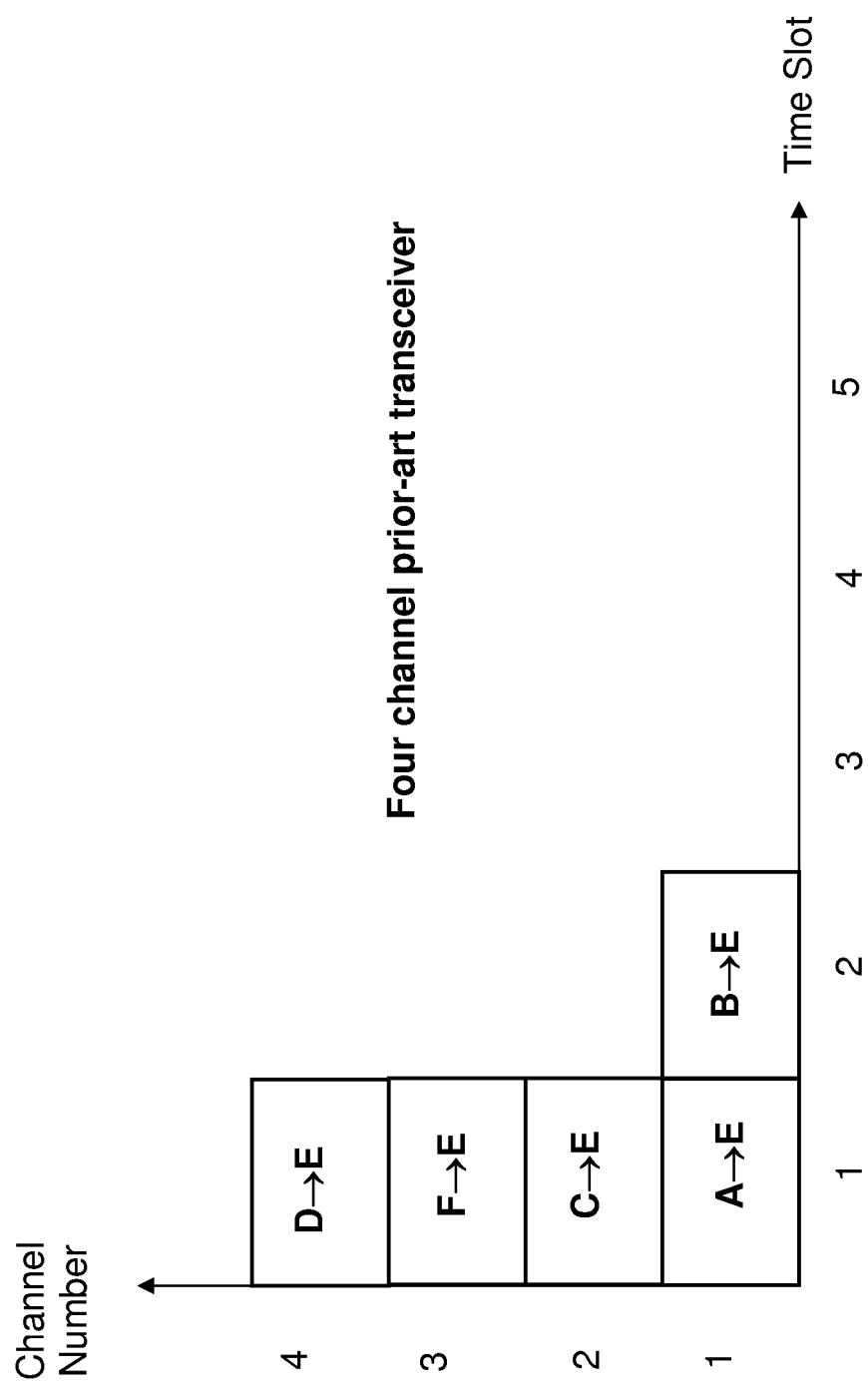
FIG. 5b shows an example of an improved MANET MAC with added frequency dimension, implemented using a prior-art four simultaneous receive channels, according to an embodiment of the invention.

FIG. 5a shows an example of prior-art MANET network and MAC. FIG. 5b shows an example of an improved MANET MAC with added frequency dimension, implemented using a prior-art four channel receiver, according to an embodiment of the invention. Nodes A, B, C, D and F hold packets to be transmitted to node E. In order to transmit, a node A to D needs to find time slots, in which the counterpart destination node E is not transmitting and a frequency channel in which no other node that is a neighbor of the destination node E transmits and interferes to the reception. Once the proper transmission frequency has been determined, and if the destination node E is not transmitting in that slot, it will receive the transmission. Thus, in conventional MANETs, each node also needs to avoid transmission to a receiver while another neighboring node also transmits to that same receiver. In fact, the receiver is waiting on a certain frequency channel, and becomes a bottleneck, since the transmitters are waiting until the receiver is capable of receiving them exclusively. According to FIG. 5b, the receiver is capable of simultaneous receiving four channels, and the resulting delay is much shorter than in conventional MANET systems. In this example, 5 transmissions should reach node E, but there are only four simultaneous receive channels. Therefore, nodes A, C, D and F transmit to node E during the $1^{st}$ time slot and node B transmits to node E during the 2nd time slot. Still, transmission is completed while saving the time of 3 time slots.

FIG. 5c shows the same example of a MAC with added frequency dimension, implemented using improved MANET transceiver architecture, according to an embodiment of the invention. Since the receiver is capable to receive the whole frequency band simultaneously, if node E is not transmitting, then it is capable to receive all the packets in one time slot.

FIG. 5 is just a one example to an embodiment of the invention. Notice that the frequency channels in FIG. 5c can be either real channels, or "logical" frequency hopping channels. The number of channels is not limited to 5 hardware receive channels, but can be tens-hundreds digitally formed channels with such techniques as "weighted FFT". The current FPGA technology enables implementing a very large number of receive channels, and this number will grow as the "strength" of FPGAs or other digital signal processing devices continues to grow.

Advantages of Improving the Spectrum-Efficiency of a MANET

1. Running Multicast Applications Over MANETs.

Such applications will run much better on a system that allows receiving narrowband data from multiple sources.

2. Avoiding a-Priori Channel Frequency Allocations to Nodes.

A-priori frequency allocation design is a complex challenge, well known to people skilled in ad-hoc network design. The capability of simultaneously receiving several channels avoids the need to plan their sequential use.

3. Latency Reduction.

By simultaneously receiving several transmissions, the number of bottlenecks in the system will be reduced, because the nodes performing "store and forward" operations will be able to simultaneously receive several nodes requiring relay services, rather than receiving them sequentially.

4. Improved Spectral Efficiency.

The simultaneous reception of several channels allows the introduction of cognitive-like properties to the network. For instance, the nodes will be able to identify unutilized spectral "chunks" and transmit in these ranges without the need to coordinate the receivers.

5. Improved System Reliability.

The improvement will be especially effective in urban areas, where certain frequency ranges are likely to suffer from harsh multi-path fading. One way to overcome that fading will be to "frequency-replicate" the transmissions over several channels widely spread out in frequency. Due to the simultaneous multi-channel wideband reception capability, there will be an increased probability that the receiver will correctly detect at least one of them.

6. System Capacity Increase.

System capacity is directly related to the number of successful message detections carried out by each one of the nodes in the system.

7. Improved Awareness of the Presence of "Alien Nodes".

This improvement can help in preventing danger of "friendly crossfire", and in enhancing coordination among first responders and rescue forces belonging to different units, when there is no a-priori coordination of communication resources (e.g. firefighters, police, paramedics).

8. Improving the Capability of Avoiding Flight Collisions. (in airborne applications).

Using Improved MANET to Enhance the Capacity of Conventional MANETs

Periodically Distributed Broadcast Message

In case of a fully connected mesh network with subscribers that are exchanging small periodical broadcast packets (for example, Situational Awareness information containing the self position of the sender) that are destined to all members of the network, the networking parameters are:

K time slots per second (each slot is used for transmitting one packet)

N subscribers (nodes)

M frequency channels

The effective capacity C(M,N) of the network with M channels and N nodes is defined as the total number of packets that are received per second. For M=1 (a single channel), the effective capacity is $C(1,N)=K*(N-1)$ since there are K packets per second, and every packet is received N−1 times (by the N−1 neighbors of the sender).

K*M is the number of resources per second in the system (each resource is defined by its slot and its channel). In an ideal multi-channel TDMA setting with M channels and full-duplex capabilities, the receiver is capable of receiving during transmission, and the effective capacity is $C(M,N)=K*M*(N-1)$, since every resource is received by N−1 nodes. However, in a half duplex system, the sender that sends its packet over one of the M channels, is not capable of receiving the remaining M−1 transmitters during its own transmission. Thus, the effective capacity is $C(M,N)=K*M*(N-1-(M-1))=K*M*(N-M)$.

Now, $C(M,N)/C(1,N)=K*M*(N-M)/K*(N-1)=M*(N-M)/(N-1)=M(N-1-(M-1))/(N-1)=M-M(M-1)/(N-1)$, where $N \gg M^2$, $(N-1) \gg M(M-1)$ and $C(M,N)/C(1,N) \rightarrow M$. Therefore, when N is large enough (compared to M, which is the common case), the capacity with multi-channel reception is almost M times larger, and approaches the ideal full duplex case.

Addressed Message

Figure 8:
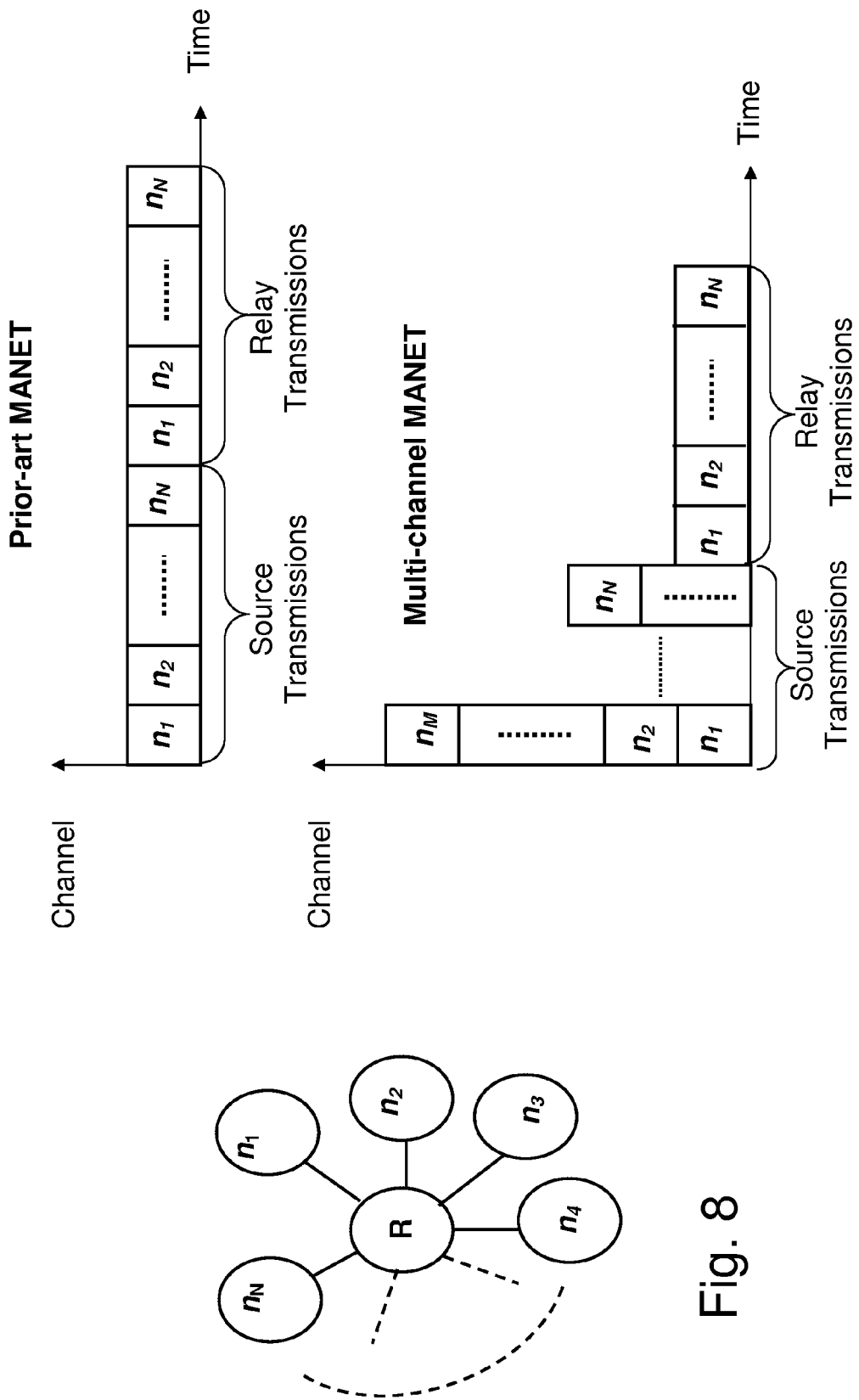
FIG. 8 illustrates delay reduction in a mesh network with a star topology of N+1 nodes with one relay in the middle, according to an embodiment of the invention.

In a first exemplary scenario, the mesh network is a star network of N+1 nodes with one relay in the middle. Each of the nodes that reside in the edges of the star sends packets to one randomly chosen node in another edge of the star. The bound on the minimal total delay in a conventional MANET is: N+N=2N slots (one slot for each source transmission and one slot for the relay of each packet). On the other hand, in a multi-packet reception of a MANET with M channels, as proposed by the present invention, the bound on the minimal delay is ⌈N/M⌉+N (where ⌈x⌉ denotes the smallest integer greater or equal x), as shown in FIG. 8. For any M>1 the delay is reduced, and for M≫N, the delay is reduced by a factor of almost 2.

Figure 9:
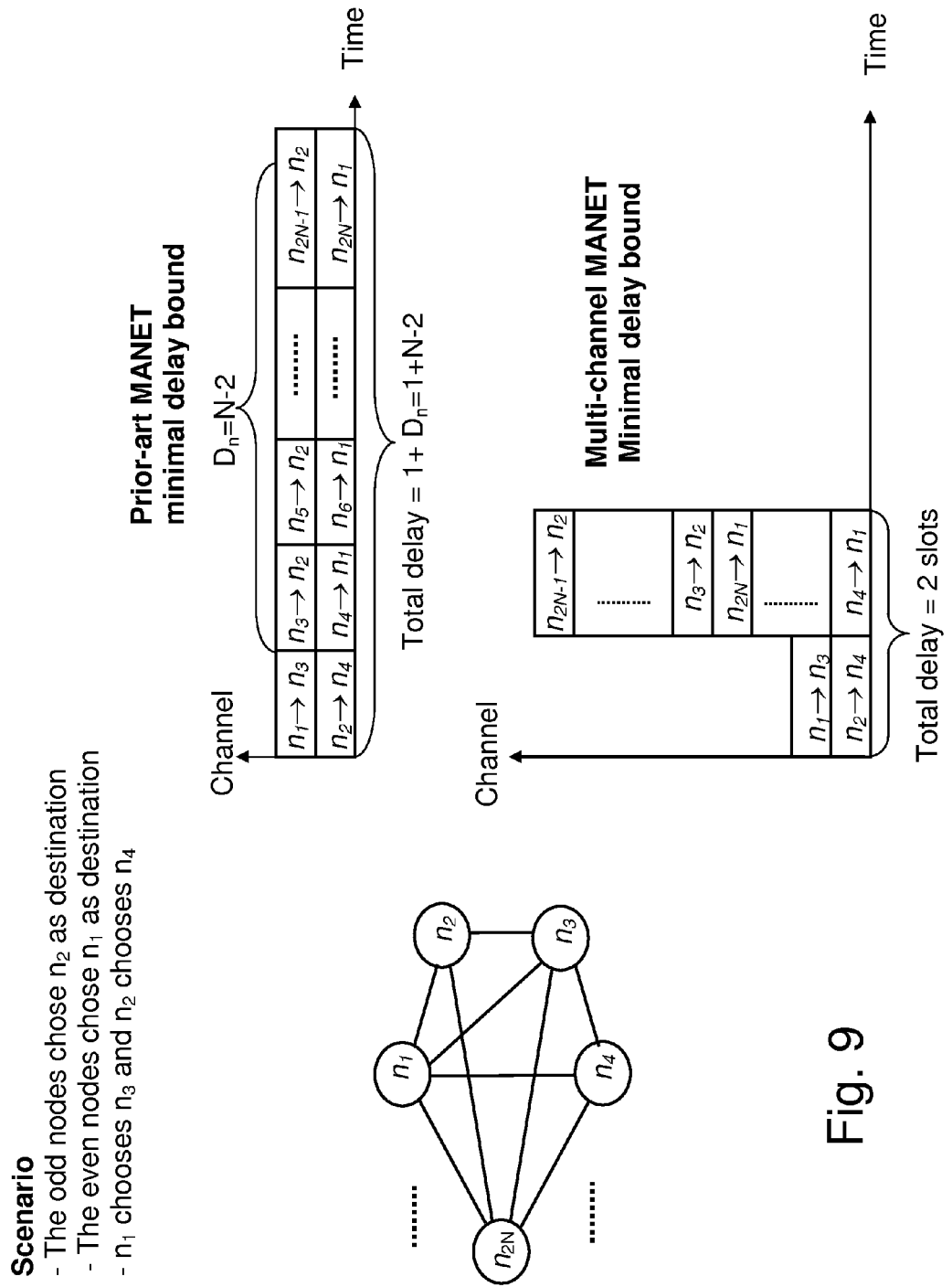
FIG. 9 illustrates delay reduction in a mesh network that comprises 2N nodes, according to an embodiment of the invention.

In a second exemplary scenario, the mesh network comprises 2N nodes. Each node sends a packet to a randomly selected node. In a conventional MANET that uses M channels, two different nodes can receive packets simultaneously from two different sources in two different channels, but each node can receive only one packet at a time. In the multi-channel reception MANET, as proposed by the present invention, each node can receive packets simultaneously from up to M sources. The bound on the minimal delay in a conventional MANET is $\max_n\{1+D_n\}$ where $D_n$ is the number of nodes that node n had choose as a destination (the addition of 1 is since each node n also needs a time slot to transmit its own packet). The bound on the minimal delay in multi-channel MANET is $\max_n\{1+\lceil(D_n)/M\rceil\}$. For M>N, the delay bound is reduced to 2 slots, as shown in FIG. 9.

The improved MANET system can be split into a number of dynamically reconfigurable subsystems, each operating in its own sub-band "slice" and simultaneously receiving the channels belonging to that sub-band. Simultaneous transmission capability may be achieved when the transmission and reception spectral allocation allows that. When the transmit and receive spectral allocation allows that, if the improved MANET radio is built using full-duplex architecture, then the nodes will be able to simultaneously transmit and receive over several channels.

Latency Reduction Using Simultaneous Reception

Latency reduction is an important advantage for all QoS (Quality of Service)-related applications, such as VoIP (voice call over an IP network), video streaming and digital voice that simulates a legacy PTT (Push To Talk—a method of conversing on half-duplex communication lines, including two-way radio, using a momentary button to switch from voice reception mode to transmit mode) broadcast network ("PTT-voice"). In digital PTT-voice, a call setup procedure (i.e. signaling protocol prior to the voice call) is not applicable, since the PTT voice application cannot tolerate the delay of the signaling. An example of a PTT-voice application is a police voice network. In order to support PTT-voice services with low delay and jitter and high availability, the time slots should be pre-allocated with no interference with other data, so that when a user presses the PTT button, other users will receive its transmissions with minimum delay.

Figure 6:
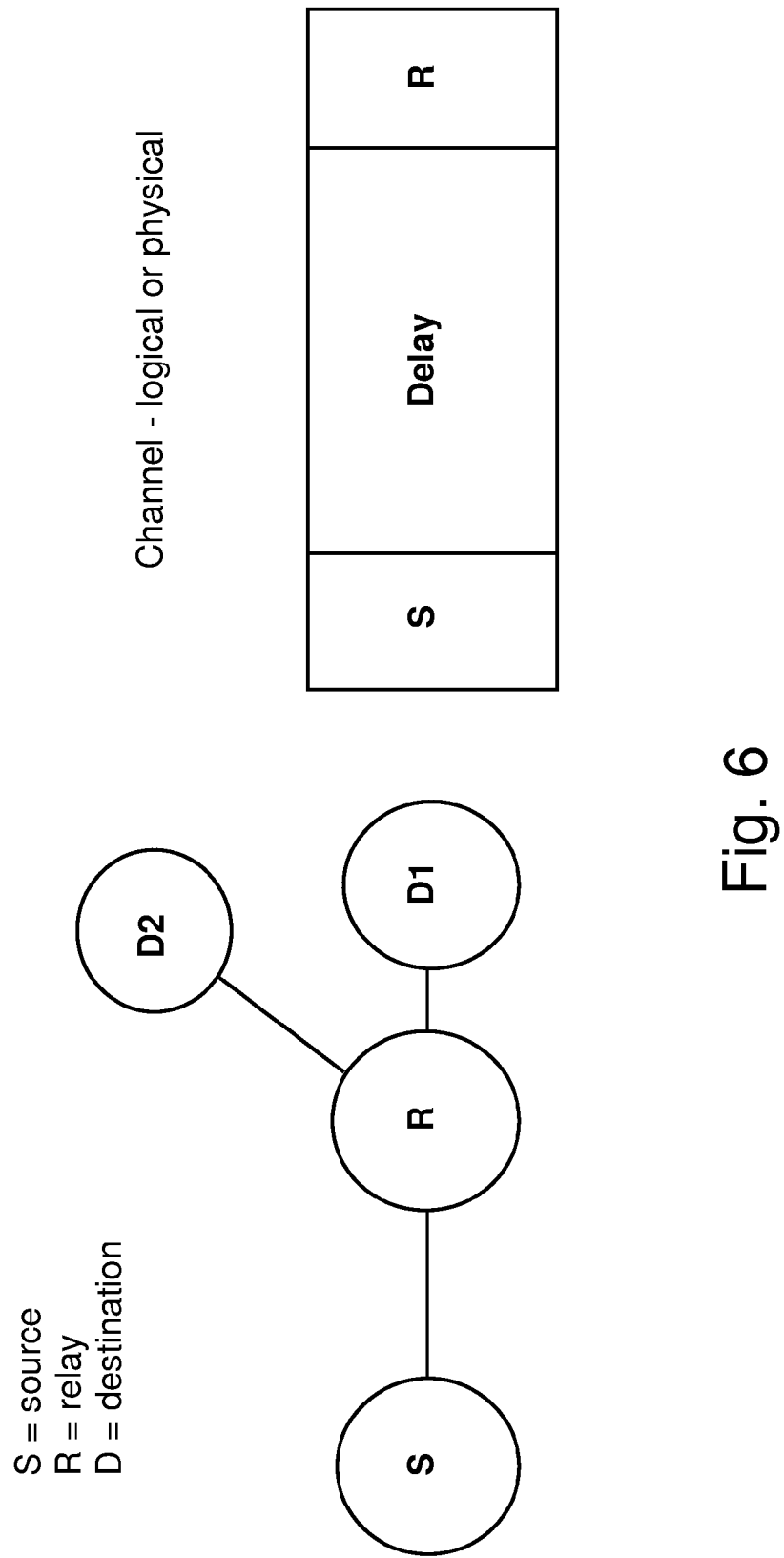
FIG. 6 (prior art) shows a sequential slot allocation for the source and the relay in a MANET system.

In conventional MANETs, implementing multi-hop reliable relay (repeater) operation for voice, requires pre-allocation of separate time resources both for the source and for the relay. This strategy guarantees that the relays will not interfere with the source, and that all the destinations will be able to receive the source and/or the relays without interference. The allocation of separate time slots for a relay increases the percentage of time resources allocated for voice in the MANET. The slot allocation for the source and the relay is sequential with an internal delay that depends on the implementation, as shown in FIG. 6.

Figure 7:
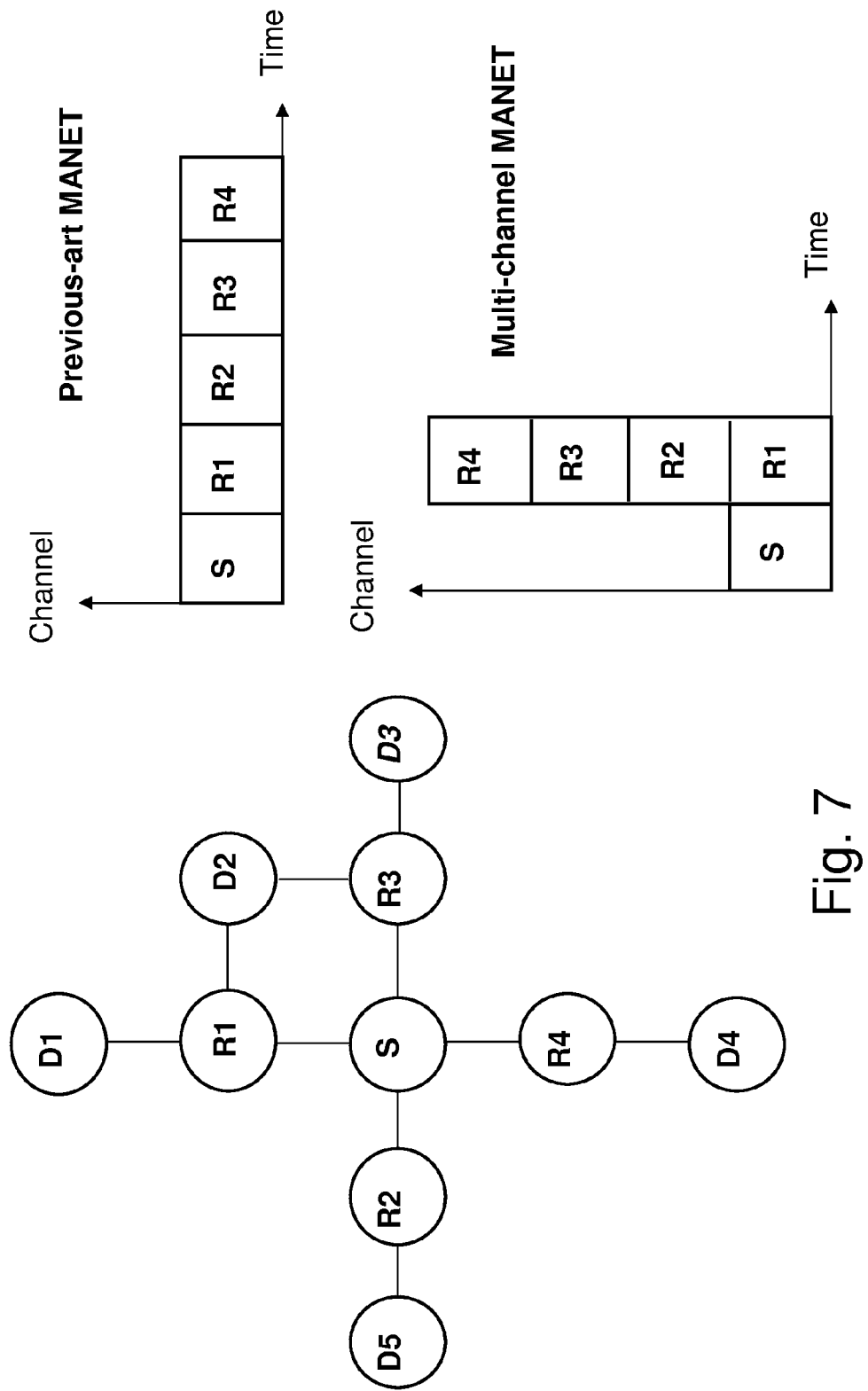
FIG. 7 illustrates latency reduction in a multi-channel MANET system with topology of ten nodes, according to an embodiment of the invention.

In broadcast or multicast PTT-voice, there are many cases in which more than one relay node is required to cover a 2-hop neighborhood of the sender. Such cases occur when the destinations are geographically scattered in such a way that one relay node does not cover them all. FIG. 7 shows a topology of ten nodes, when the source (S) is in the middle. In this topology, four relay nodes $R_1$, $R_2$, $R_3$ and $R_4$ are needed in order to reach all the destinations $D_1$, $D_2$, $D_3$, $D_4$ and $D_5$.

In conventional MANETs, all the relays should transmit using the same frequency (or the same frequency-hopping pattern) as the source, since the destinations are not able to choose the right frequency to listen to without a signaling procedure prior to voice transmission. The relays cannot use the same time slots, since there may be a collision between the transmissions of different relays. Hence, each relay is bound to transmit in a different time slot using the same channel. The slots that are allocated for the source and/or for the relays cannot be used by the destinations for different data services without degrading the availability performance. If, for example, a destination transmits in these time slots (even in a different frequency), it will not receive the voice packets once they arrive. The resulting implementation of broadcast PTT-voice in the conventional MANET suffers from a tradeoff between the number of supported relays and the total multi-hop latency as well as the total time consumption of the voice service. The time slots that are allocated for voice cannot be used efficiently for other services, and the total utilization decreases with the number of supported relays.

According to an embodiment of the invention, the improved MANET is capable of reducing the time consumption and the delay by exploiting the multi-packet reception capabilities of a multi-channel MANET in which each destination node can receive several channels simultaneously. Since the improved MANET relay nodes are not bound to transmit in different time slots, they may transmit simultaneously, using different channels. The result is a lower delay and a better time utilization. In a conventional MANET, the four relay nodes will transmit in different time slots and the total time consumption for relay will be at least four slots for each source slot. Using the improved MANET method, in the topology illustrated in FIG. 7, R1 and R2 can transmit simultaneously at the same time slot and also R3 and R4 can transmit simultaneously at the same time slot. Hence, the delay, as well as the time consumption, will be reduced by a factor of 2 with respect to a conventional MANET.

The total delay reduction of the relay depends on the number of channels, M, that can be used. For instance, for M=2, the delay will be reduced by factor 2. Unlike prior-art transceiver architecture, in which the number of relays is limited by the small number of channels, with the improved MANET transceiver architecture, the number of relays is not limited. Another advantage of multidimensional MANET is the inherent reliability in the frequency dimension on top of the network reliability in the time dimension. A destination node can receive the same packet few times (from different channels), thereby gaining an inherent redundancy. In the example of FIG. 7, node D2 receives the packets from both nodes R1 and R3.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for improving the spectral efficiency and scalability of a Mobile Ad-Hoc Networking (MANET) system, comprising:
   a) at each node, providing a transceiver architecture that includes a combination of a transmitter being capable of dynamically selecting its channel frequencies within the whole operational RF band assigned to said system and a wideband receiver that is being capable of simultaneously receiving and processing signals received from nodes of said MANET in different frequency channels within the whole operational band assigned to said system, at once, and that includes channel frequencies, dynamically selected within a wide operating bandwidth;
   b) allowing each node to simultaneously receive all other nodes which are in range within the whole operating band assigned to said system such that each of the remaining nodes determines the transmission frequency for each time slot;
   for each transmitting node
   c) finding time slots, in which a counterpart transceiver at each remaining active node is not transmitting and a frequency channel in which no other active node, neighboring said counterpart receiver, transmits; and
   if no other node had chosen the same time slot, and if the transceiver is not transmitting in said slot, receiving the transmission, while allowing relay nodes to transmit simultaneously, using different channels,
   wherein the decision which node in the MANET should transmit is made independently and separately for each time-slot.

2. A method according to claim 1, further comprising:
   a) continuously collecting data regarding the number of active nodes that belong to the MANET system and regarding the presence of alien transceivers in the neighborhood of the active nodes;
   b) processing the collected data;
   c) determining frequency transmission patterns to use the least possible number of frequencies according to the active population status, transmission requirements and priorities of said nodes; and
   d) using the processed data for adapting the transmission scheme in presence of alien transceivers, thereby avoiding transmission at frequencies of alien transmitters.

3. A mobile communication system consisting of a plurality of MANETs, comprising, at each node:
   a) a transceiver being a combination of:
   a.1) a hopping transmitter operating according to a predetermined hopping sequence and rate;
   a.2) a wideband reference receiver, that is being capable of simultaneously receiving at once, the whole operating band assigned to said system;
   b) circuitry for reallocating simultaneously receiving channels, dynamically spread over a wideband frequency range; and c) circuitry for determining transmission hopping patterns to use the least possible number of frequencies according to the active population status of nodes that belong to said plurality of MANETs and for adapting the transmission scheme of said alien transceivers by finding time slots, in which a counterpart receiver at each remaining active node is not transmitting and a frequency channel in which no other active node, neighboring said counterpart receiver transmits, and determining proper transmission frequency for each transmitting node, wherein the decision which node in a MANET should transmit is made independently and separately for each time-slot.

4. A mobile communication system according to claim 3, in which broadcast packets are received and transmitted.

5. A mobile communication system according to claim 3, in which the number of active channels is dynamically determined according to the number of active nodes and their data throughput demands.

6. A mobile communication system according to claim 3, in which the wideband reference receiver receives a plurality of channels within the whole operational RF band simultaneously, and includes:
a) a global band preselector for selecting a wide-band range;
b) a global Low Noise Amplifier for amplifying the selected wide-band range;
c) a global gain control unit, for controlling the global gain of said wideband reference receiver;
d) an anti-aliasing filter for filtering the amplified signals;
e) one or more Analog to Digital Converters (ADCs) for sampling the received signal;
f) an ADC driver for controlling the operation of said ADCs;
g) a control unit for controlling the gain of said global gain control unit; and
h) a digital signal processing unit for processing at once, samples from the whole RF band, wherein said digital signal processing unit is capable of:
h.1) simultaneously detecting a plurality of signals, transmitted by nodes of said MANET, each at a frequency channel within the assigned RF wide band;
h.2) simultaneously reconstructing the data carried by said plurality of signals.

7. A mobile communication system according to claim 6, in which the received signal is directly sampled at Radio Frequency.

8. A mobile communication system according to claim 6, in which the received signal is indirectly sampled after down-conversion.

9. A mobile communication system according to claim 3, in which the reference transmitter includes:
a) signal processing unit for generating a transmit base-band signal samples of the modulated signal, right at final frequency, in a digital form;
b) a Digital to Analog Converter (DAC) for converting said samples to analog values;
c) a first global-band filter for transforming said signal samples out of said DAC to an analog form;
d) a low-level RF pre-amplifier for pre-amplifying the analog signal being output by said global-band reconstruction filter;
e) a power-control attenuator, whose attenuation level is dynamically controlled by the control unit, for adjusting the power level of the amplified signal;
f) a second global-band filter connected to the attenuator output, for filtering far-out distortion products generated by said RF pre-amplifier;
g) an RF Driver followed by a final Power Amplifier (PA), for amplifying the output of said second global-band filter up to a level being sufficient to drive said final Power Amplifier (PA) to the maximal allowed transmit power;
h) a global-band Harmonic Filter, connected to the output of said final Power Amplifier (PA), for filtering the PA products at multiples of the transmit frequency; and
i) a transmit antenna for transmitting the filtered signal at the output of said global-band Harmonic Filter.

10. A mobile communication system according to claim 3, in which nodes receive and transmit by using half-duplex transceivers.

11. A mobile communication system according to claim 3, in which packets having different size are received and transmitted.

12. A mobile communication system according to claim 3, in which the digital signal processing section is implemented using Field Programmable Gate Arrays (FPGAs).

* * * * *